(12) United States Patent
Yang et al.

(10) Patent No.: US 9,913,354 B1
(45) Date of Patent: Mar. 6, 2018

(54) UNPOWERED TUNING INTERFACE CIRCUIT FOR AN LED DRIVER

(71) Applicant: Universal Lighting Technologies, Inc., Madison, AL (US)

(72) Inventors: Haiqing (Paul) Yang, Madison, AL (US); Stephen D. Mays, II, Madison, AL (US); Scott Price, Madison, AL (US); Wei Xiong, Madison, AL (US)

(73) Assignee: UNIVERSAL LIGHTING TECHNOLOGIES, INC., Madison, AL (US)

( * ) Notice: Subject to any disclaimer, the term of this patent is extended or adjusted under 35 U.S.C. 154(b) by 0 days.

(21) Appl. No.: 15/637,181

(22) Filed: Jun. 29, 2017

Related U.S. Application Data

(60) Provisional application No. 62/361,191, filed on Jul. 12, 2016.

(51) Int. Cl.
  *H05B 33/06* (2006.01)
  *H05B 37/02* (2006.01)
  *H05B 33/08* (2006.01)

(52) U.S. Cl.
  CPC ..... *H05B 37/0272* (2013.01); *H05B 33/0812* (2013.01); *H05B 33/0815* (2013.01)

(58) Field of Classification Search
  None
  See application file for complete search history.

(56) References Cited

U.S. PATENT DOCUMENTS

2012/0262432 A1* 10/2012 Kamata .............. H05B 33/0815
                                                               345/204

* cited by examiner

*Primary Examiner* — Dedei K Hammond
(74) *Attorney, Agent, or Firm* — Patterson Intellectual Property Law, P.C.; Mark J. Patterson; Gary L. Montle

(57) ABSTRACT

An LED driver circuit capable of being tuned via an unpowered tuning process and associated methods are provided. A radio frequency (RF) coupling circuit receives an RF tuning signal having a plurality of cycles of an RF carrier. The RF coupling circuit outputs a coupled RF tuning signal to a direct current (DC) generator circuit which rectifies the coupled RF tuning signal and outputs a rectified RF tuning voltage. A RF demodulation circuit receives the rectified RF tuning signal and selectively converts each burst of the rectified RF tuning signal to a single DC pulse. The RF demodulation circuit includes a Zener diode limiting the emitted voltage from the RF demodulation circuit. The microcontroller receives the output of the RF demodulation circuit, receives the regulated voltage, and controls one or more tuning operations of the LED driver circuit.

20 Claims, 4 Drawing Sheets

UNPOWERED TUNING INTERFACE CIRCUIT FOR AN LED DRIVER

CROSS-REFERENCES TO RELATED APPLICATIONS

This application claims benefit of U.S. Provisional Patent Application No. 62/361,191, filed Jul. 12, 2016, entitled "Unpowered Tuning Interface Circuit for an LED Driver," which is hereby incorporated by reference in its entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to an unpowered tuning interface circuit for a light emitting diode (LED) driver. More specifically, the present invention further relates to providing an unpowered tuning interface circuit at an LED driver, the unpowered tuning interface circuit capable of group tuning alongside a plurality of LED drivers via one or signals received from a development tool, while minimizing an internal current draw of each LED driver.

LED technology has changed the way the world sees lighting. LED lighting provides numerous benefits over traditional fluorescent lighting, such as longer life, high efficacy, green energy, high level of flexibility, and dimming ability. However, these benefits require perfectly matched power supplies (LED drivers).

LED drivers with tuning capabilities provide the ability to set the output current of the LED driver at different levels based on a particular profile. One key feature that is widely desired by customers is unpowered tuning. Unpowered tuning provides great flexibility in configuring and using LED lighting systems. For unpowered tuning, one desired feature is enabling the LED driver output current to be tuned without the LED driver being powered up.

What is needed is a single development tool capable of tuning a plurality of LED drivers at the same time, hence giving customers enhanced flexibility.

BRIEF SUMMARY OF THE INVENTION

Implementations consistent with the present disclosure are configured to reduce the cost and size of unpowered tuning interface circuitry of a light emitting diode (LED) driver. LED driver circuit designs including an unpowered tuning interface circuit as disclosed herein enable a plurality of LED drivers to be tuned at the same time according to one or more signals received from a development tool. The circuitry and methods described herein are capable of achieving the desired group tuning with simplicity and low cost. The LED driver circuit is configured to minimize internal current draw of unpowered tuning interface circuitry and hence maximize DC power payload delivered to LED driver control circuitry. The LED driver circuit is further configured to maximize the number of LED drivers that a development tool can drive. The disclosed apparatus and methods are capable of benefitting customers with extended flexibility during unpowered tuning. The present invention addresses the desired unpowered tuning by means of a development tool via a radio frequency (RF) signal in one exemplary embodiment.

One exemplary embodiment of the present invention includes an LED driver circuit capable of being tuned via an unpowered tuning process. The LED driver circuit includes a radio frequency (RF) coupling circuit, a direct current (DC) generator circuit, an RF demodulation circuit, a voltage regulator, and a microcontroller. The RF coupling circuit receives an RF tuning signal having a plurality of bursts of RF energy. Each burst of energy includes a plurality of cycles of an RF carrier. The RF coupling circuit outputs a coupled RF tuning signal to the DC generator circuit. The direct current (DC) generator circuit uses a bridge rectifier to rectify the coupled RF tuning signal and outputs a rectified RF tuning voltage to the RF demodulation circuit. The RF demodulation circuit receives the rectified RF tuning signal and selectively converts each burst of the rectified RF tuning signal to a single DC pulse. The RF demodulation circuit includes a transistor having a collector connected to the input of the RF demodulation circuit and an emitter connected to the output of the RF demodulation circuit. The transistor base is connected to the input via an input resistor. The transistor base is also connected to a Zener diode which limits the base voltage and thereby limits the emitted voltage on the output. The voltage regulator receives the rectified RF tuning voltage and outputs a regulated voltage. The microcontroller receives the output of the RF demodulation circuit, receives the regulated voltage, and controls one or more tuning operations of the LED driver circuit.

Another exemplary embodiment of the present invention includes a method for performing unpowered tuning of an LED driver circuit having a microcontroller and a voltage regulator. The method begins by receiving an RF tuning signal having a plurality of bursts of RF energy. Each burst of energy includes a plurality of cycles of an RF carrier. A coupled RF tuning signal is generated based at least in part upon the RF tuning signal. The coupled RF tuning signal is rectified and output as a rectified RF tuning voltage. Each burst of the rectified RF tuning signal is selectively converted to a single DC pulse via a single transistor. A base voltage of the transistor is limited to thereby limit a microcontroller input voltage. The rectified RF tuning voltage is received at a voltage regulator and a regulated voltage is output from the voltage regulator. The microcontroller receives an input voltage and the regulated voltage and controls one or more tuning operations of the LED driver circuit.

In a further exemplary embodiment of the present invention, a system for providing unpowered tuning of LED drivers is provided. The system includes a development tool and at least one LED driver circuit. The development tool includes a development microcontroller, a mixer coupled to the development microcontroller, and a carrier signal generator coupled to the mixer. The microcontroller is configured to communicate a radio frequency RF signal to the mixer, and the mixer is configured to generate a RF tuning signal at least in part according to a carrier signal generated by the carrier signal generator.

Each LED driver circuit includes an RF coupling circuit which receives an RF tuning signal having a plurality of bursts of RF energy from the development tool. Each burst of energy includes a plurality of cycles of an RF carrier. The RF coupling circuit outputs a coupled RF tuning signal to the DC generator circuit. The DC generator circuit rectifies the coupled RF tuning signal using a bridge rectifier and outputs a rectified RF tuning voltage to the RF demodulation circuit. The RF demodulation circuit receives the rectified RF tuning signal at its input and selectively converts each burst of the rectified RF tuning signal to a single DC pulse as the output. The RF demodulation circuit includes a transistor having a collector connected to the input and having an emitter connected to the output. The transistor has a base connected to the input of the RF demodulation circuit via an input resistor. The base of the transistor is further connected to a Zener diode which limits the base voltage and thereby limits the emitted voltage on the output of the RF demodulation circuit. A voltage regulator receives the rectified RF tuning voltage and outputs a regulated voltage. A microcontroller receives the output of the RF demodulation circuit, receives the regulated voltage, and controls one or more tuning operations of the LED driver circuit.

Numerous other objects, features, and advantages of the present invention will be readily apparent to those skilled in the art upon a reading of the following disclosure when taken in conjunction with the accompanying drawings.

DETAILED DESCRIPTION OF THE INVENTION

Figure 1:
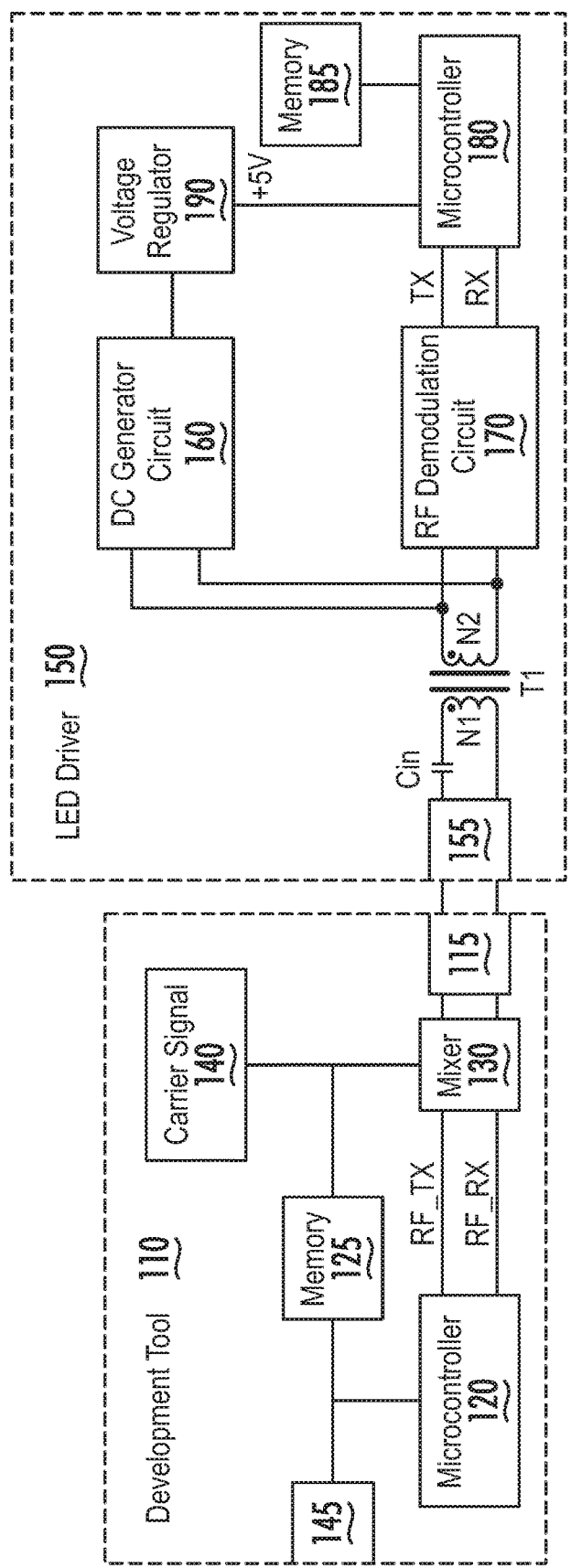
FIG. 1 illustrates a block diagram of an unpowered tuning system according to an exemplary embodiment.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

Referring generally to FIGS. 1-4, an exemplary unpowered tuning interface circuit of a light emitting diode (LED) driver and associated methods are now illustrated in greater detail. Where the various figures may describe embodiments sharing various common elements and features with other embodiments, similar elements and features are given the same reference numerals and redundant description thereof may be omitted below.

FIG. 1 illustrates a block diagram of an unpowered tuning system 100 according to an exemplary embodiment. The unpowered tuning system 100 includes a development tool 110 and a light emitting diode driver 150. As used herein, the term "unpowered" may refer to one or more modes of operation or power settings where an LED driver is not connected to a conventional power source such as an alternating current (AC) mains. In one exemplary embodiment, an LED driver is configured to receive both operating power and tuning signal(s) from the development tool 110 while the LED driver is not connected to a traditional power source.

The development tool 110 may be a radio frequency (RF) transmitting device in one embodiment. The development tool 110 may include at least one of a communications interface 115, a microcontroller 120, a memory 125, a mixer 130, a carrier signal generator 140, and an external input interface 145. Although illustrated as each being contained within the development tool 110, in various embodiments one or more of the communications interface 115, the microcontroller 120, the memory 125, the mixer 130, the carrier signal generator 140, and the external input interface 145 may be external to the development tool 110, and may be communicatively coupled to the development tool 110 (for example, using a conductive bus, a wired or wireless signaling interface, the Internet, or any other communications medium capable of connecting at least one of the communications interface 115, the microcontroller 120, the memory 125, the mixer 130, the carrier signal generator 140, and the external input interface 145 to at least one of the communications interface 115, the microcontroller 120, the memory 125, the mixer 130, the carrier signal generator 140, and the external input interface 145.

The development tool 110 may be configured to generate and/or receive at least one tuning signal. The tuning signal may be communicated to and from the development tool 110 via one or more wired or wireless communication lines. In one exemplary embodiment, the tuning signal may be transmitted from the development tool 110 via an RF transceiver operating as the communications interface 115, coupled to the development tool 110. Although described with reference to an RF transceiver, it should be appreciated that the communications interface may be any wired or wireless communications interface capable of transmitting or coupling information from the development tool 110 or receiving information at the development tool 110. The microcontroller 120 may be communicatively coupled to the mixer 130. For example, the microcontroller 120 may be coupled to the mixer 130 via one or more wired or wireless communication lines. In the embodiment illustrated in FIG. 1, the microcontroller 120 is coupled to the mixer 130 by two communication lines RF_TX and RF_RX. The mixer 130 may also be coupled to the carrier signal generator 140 via one or more wired or wireless communications lines. In the embodiment illustrated in FIG. 1, the mixer 130 is coupled to the carrier signal generator 140 by one conductive line.

At least one of the microcontroller 120 and memory 125 may be coupled to an external input interface 145. The external input interface 145 may be configured to be communicatively coupled to an external control or programming source. For example, in one embodiment, the external input interface 145 may be a communications port connected to an external computing device, where the external input interface 145 is configured to receive one or more tuning parameters from the external computing device and to communicate the one or more tuning parameters to at least one of the microprocessor 120 and the memory 125. In one exemplary embodiment, the external input interface 145 may include a universal serial bus (USB) connector configured to communicatively couple to an external computing device to receive one or more sets of instructions or data associated with the development tool 110.

The memory 125 may be coupled to at least one of the communications interface 115, the microcontroller 120, the mixer 130, the carrier signal generator 140, and the external input interface 145. The memory 125 may be at least one of a random access memory (RAM) or another type of dynamic storage device that stores information and instructions and/or data. The memory 125 may include a conventional read only memory (ROM) device or another type of static storage device that stores static information and instructions and/or data. The memory 125 may include a magnetic and/or optical recording medium and a corresponding drive. Further, the memory 125 may include a local, remote, or combined local and remote storage configuration. For example, the memory 125 may be a local memory coupled to the development tool 110, may be a remotely located storage accessible by the development tool 110, may be a cloud-based or distributed storage array (e.g., where at least a portion of data associated with the memory 125 is stored either in whole or in part either locally or remotely or a combination thereof), or any other data storage configuration or combination thereof.

The memory 125 may be configured to store one or more instructions or data for use by the development tool 110 in providing tuning for the LED driver 150. For example, the memory 125 may be configured to store at least one of programming instructions and data used by the microcontroller 120, data associated with the carrier signal generator 140, data associated with the mixer 130, and/or data associated with at least one of the communications interface 115 or external input interface 145.

The mixer 130 is configured to receive input from at least one of the microcontroller 120 and the carrier signal generator 140 and to generate at least one tuning signal. In one exemplary embodiment, the mixer 130 is further configured to receive at least one input signal and to transmit information to the microcontroller 120 (e.g., via the RF_RX signaling line). The mixer 130 may be configured to mix, combine, generate, manipulate, modulate, demodulate, or otherwise interpret and/or edit both tuning signals and input signals. At least one of tuning signals and input signals may be transmitted from and/or received at the communications interface 115.

Figure 2:
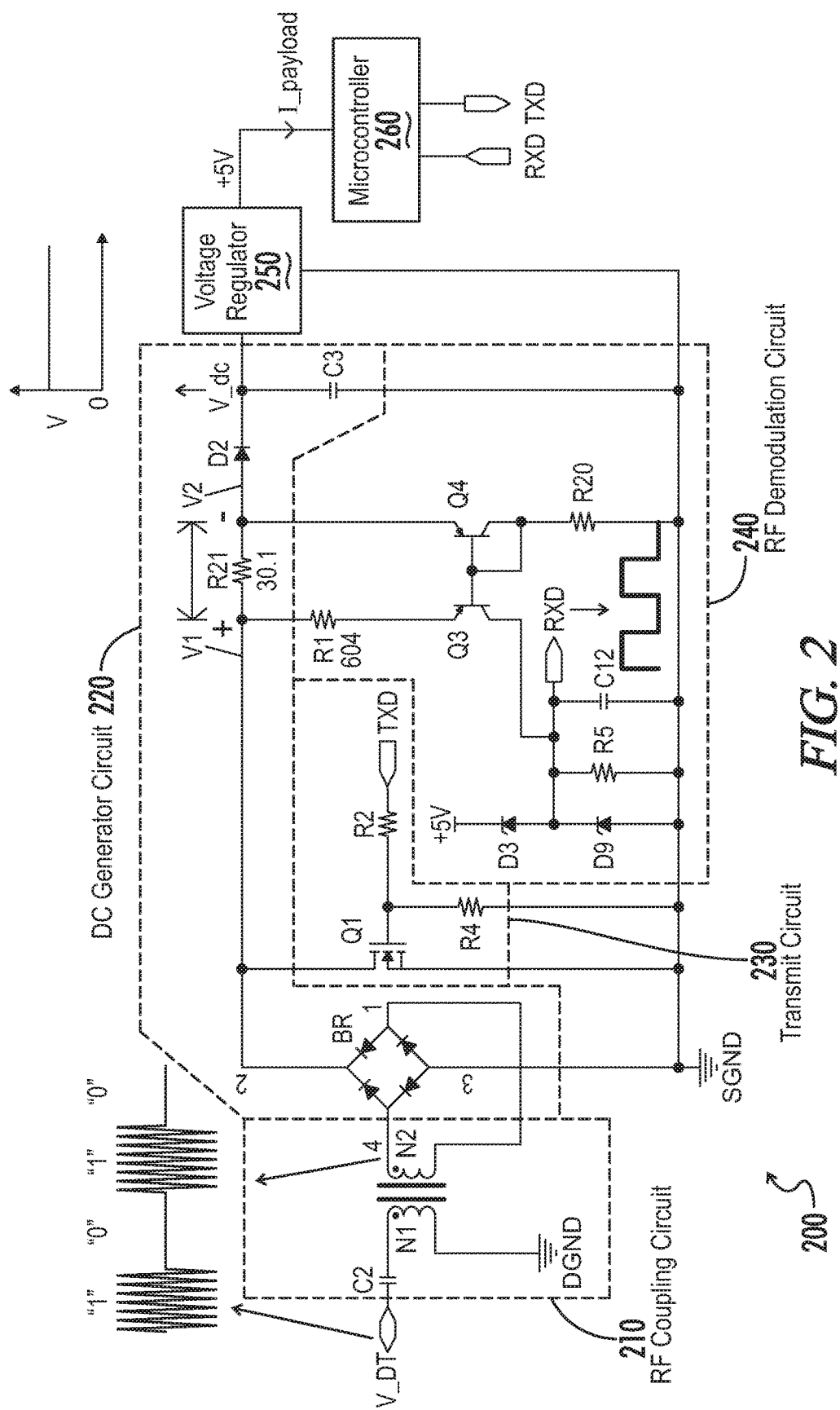
FIG. 2 illustrates a partial circuit schematic and block diagram of an existing unpowered tuning system according to an exemplary embodiment.

In one exemplary embodiment, the mixer 130 mixes or combines a carrier signal from the carrier signal generator 140 with a tuning signal received from the microcontroller 120 such that the carrier signal is modulated by the tuning signal. The tuning signal received from the microcontroller 120 may include one or more pulses transmitted or otherwise triggered by the microcontroller 120. The carrier signal, now modulated by the tuning signal, may be output from the development tool 110 via the communications interface 115. In one exemplary embodiment, the modulated carrier signal may contain a sequence of one or more data pulses configured to convey tuning data or information to the LED driver 150. For example, the presence of a pulse may encode a "1" and the absence of pulse may encode a "0", with a defined sequence of 1's and 0's representing data encoding a specific tuning parameter. As shown by FIG. 2, a pulse in the tuning signal may be defined by a burst of RF energy containing a plurality of cycles. The tuning signal mixed with and encoded onto the carrier signal may be demodulated and the tuning data decoded using the RF demodulation circuit 170 and microprocessor 180.

The LED driver 150 may include at least one of a communications interface 155, an input capacitor Cin, a transformer T1, a DC generator circuit 160, an RF demodulation circuit 170, a microcontroller 180, a memory 185, and/or a voltage regulator 190. The communications interface 155 may be a wired or wireless interface configured to transmit and/or receive information. For example, in the embodiment illustrated in FIG. 1, the communications interface 155 is configured to communicate with the development tool 110 (i.e., via the communications interface 115 of the development tool 110). The LED driver 150 may be configured to send or receive one or more signals corresponding to the development tool 110 via the communications interface 155. For example, in one exemplary embodiment, the LED driver 150 is configured to receive one or more modulated tuning signals from the development tool 110 via the communications interface 155. The communications interface 155 may be configured to communicate via one or more wired or wireless communication lines. In the exemplary embodiment illustrated by FIG. 1, the communications interface 155 is configured to communicate with the communications interface 115 of the development tool 110 via two RF signal lines. Although illustrated as communicating via two signal lines, it should be appreciated that the development tool 110 and the LED driver 150 may be communicatively coupled via any number of communication lines, including embodiments where only one communications line is configured between the communications interface 115 and the communications interface 155.

The communications interface 155 may be coupled to the input capacitor Cin. The input capacitor Cin may be connected at an opposite side to a first winding of the transformer T1. A second winding of the transformer T1 may be coupled to at least one of the DC generator circuit 160 and the RF demodulation circuit 170. In the exemplary embodiment illustrated by FIG. 1, the second winding of the transformer T1 is coupled to both of the DC generator circuit 160 and the RF demodulation circuit 170. The DC generator circuit 160 may be coupled to the voltage regulator 190. The voltage regulator 190 may be coupled to the microcontroller 180. The RF demodulation circuit 170 may be coupled to the microcontroller 180 via one or more communications lines. For example, in the embodiment illustrated by FIG. 1, the RF demodulation circuit 170 is coupled to the microcontroller via communication lines TX and RX.

At least one of the DC generator circuit 160, the RF demodulation circuit 170, and the microcontroller 180 may be coupled to the memory 185. The memory 185 may be at least one of a random access memory (RAM) or another type of dynamic storage device that stores information and instructions and/or data. The memory 185 may include a conventional read only memory (ROM) device or another type of static storage device that stores static information and instructions and/or data. The memory 185 may include a magnetic and/or optical recording medium and a corresponding drive. Further, the memory 185 may include a local, remote, or combined local and remote storage configuration. For example, the memory 185 may be a local memory coupled to the LED Driver 150, may be a remotely located storage accessible by the LED Driver 150, may be a cloud-based or distributed storage array (e.g., where at least a portion of data associated with the memory 185 is stored either in whole or in part either locally or remotely or a combination thereof), or any other data storage configuration or combination thereof. The memory 185 may be configured to store one or more instructions or data for use by the LED Driver 150. For example, the memory 185 may be configured to store at least one of programming instructions and data used by the LED Driver, and/or data associated with at least one of the LED Driver 150 or development tool 110.

FIG. 2 illustrates a partial circuit schematic and block diagram of an unpowered tuning system 200 according to an exemplary embodiment. The unpowered tuning system 200 includes an RF coupling circuit 210, a DC generator circuit 220, a transmit circuit 230, an RF demodulation circuit 240, a voltage regulator 250, and a microcontroller 260.

The RF coupling circuit 210 includes an input capacitor C2 and a digital ground DGND coupled to a first winding of a transformer T2. The RF coupling circuit 210 receives as input a development tool voltage V_DT. The development tool voltage V_DT is configured to include an RF component. In one exemplary embodiment, the development tool voltage V_DT corresponds to a modulated tuning signal generated by the mixer 130 of the development tool 110 in the manner described above. As shown in FIG. 2, the development tool voltage V_DT may include one or more pulses indicating a value of "1" when the development tool voltage V_DT is pulsed (e.g., nonzero) and a value of "0" when the development tool voltage V_DT is zero or is within an acceptable range of a threshold voltage value (e.g., as an offset). The RF component of the development tool voltage V_DT may correspond to the tuning signal modulated by the mixer 130 in one embodiment. A second winding of the transformer T2 is coupled to the DC generator circuit 220. The DC generator circuit 220 includes a bridge rectifier BR. The bridge rectifier BR is coupled to the secondary winding of the transformer T2. The DC generator circuit 220 further includes a payload current sensing resistor R21, a diode D2, and a capacitor C3. The diode D2 and the capacitor C3 are configured to rectify the modulated signal from development tool voltage V_DT and to hold the voltage to its peak level. The capacitor C3 is large enough in one embodiment such that even the development tool voltage V_DT is in a bit "0" status, the voltage V_dc is still held at a fairly constant level. However, the voltage V_dc is unregulated, and the voltage regulator 250 is required to generate a well-regulated +5V as power supply for the microcontroller. The payload current sensing resistor R21 is configured in one exemplary embodiment such that there is a voltage drop across the resistor whenever payload current flows. The voltage across the payload current sensing resistor R21 may be defined according to the equation:

$$V\_R21 = V1 - V2 = I\_payload * R21 \quad \text{(Equation 1)}$$

The voltage regulator 250 is coupled to the DC generator circuit 220 and receives the voltage V_dc as input. The voltage regulator 250 is configured to provide a constant +5V output to the microcontroller 260. The payload current I_payload corresponding to the +5V output is received at the microcontroller 260. The microcontroller 260 has an input RXD and an output TXD associated with at least one of the transmit circuit 230 and the RF demodulation circuit 240.

The transmit circuit 230 includes at least one of a switch Q1 and resistors R2 and R4. The output TXD from the microcontroller 260 is coupled to the resistor R2. The resistor R2 is coupled at an opposite side to the gate of the switch Q1 and to the resistor R4. The transmit circuit 230 is configured to receive the output TXD from the microcontroller 260 and to clamp the modulated signal associated with the secondary winding of transformer T2 to zero for duration of a zero bit of the RF component.

The RF demodulation circuit 240 includes a matching pair of switches Q3 and Q4. The switches illustrated in FIG. 2 are bipolar transistors Q3 and Q4, selected such that the base-emitter voltage of transistor Q3 is equal to the base-emitter voltage of the transistor Q4. The emitter side of switch Q3 is coupled resistor R1 and the collector side of switch Q3 is coupled to the microcontroller 260 input RXD, to capacitor C12, to resistor R5, and between diodes D3 and D5. The switch Q3 is coupled to the DC generator circuit 220 across the resistor R1 at a first (+) side of the payload current sensing resistor R21 associated with voltage V1. The emitter side of switch Q4 is coupled to the DC generator circuit 220 and the collector side of switch Q4 is coupled to resistor R20. The switch Q4 is coupled to the DC generator circuit 220 at a second (−) side of the payload current sensing resistor R21 associated with voltage V2.

The switches Q3 and Q4 are selected such that a drop in the voltage V_R21 across the payload current sensing resistor R21 is crucial to provide bias current for the switch Q3 to properly operate. The collector current IC_Q3 of the switch Q3 may be defined by the equation $$IC\_Q3 = V\_R21 / R1 \quad \text{(Equation 2)}$$

The resistor R5 and the capacitor C12 serve as a peak detector such that bit "1" and bit "0" are separated from the input modulated signal.

The implementation illustrated by FIG. 2 suffers numerous drawbacks. First, in the event of a voltage drop across the payload current sensing resistor R21, the voltage V_R21 degrades the signal integrity of V_dc both because the voltage V_dc is reduced compared to voltage (i.e., V_dc=V1−V_R21), and because noise can be introduced to V_dc if the payload current I_payload varies rapidly. Second, implementing the switches Q3 and Q4 requires a matching pair not to damage the microcontroller (e.g., as described above in relation to equal base-emitter voltages). The cost of a matching pair of bipolar transistors can be significantly higher than a single transistor. The part source of the transistors can also be limited. Third, an external 5V reference is required to provide protection for RXD against high voltage levels which might damage the microcontroller 260. However, if an onboard +5V reference is used as the 5V reference, a nest situation is formed. That is, if V_dc is in an uncertain situation such as startup transient or an overload condition, the +5V can be degraded, and thus protection for the microcontroller against high voltage level could be lost.

Figure 3:
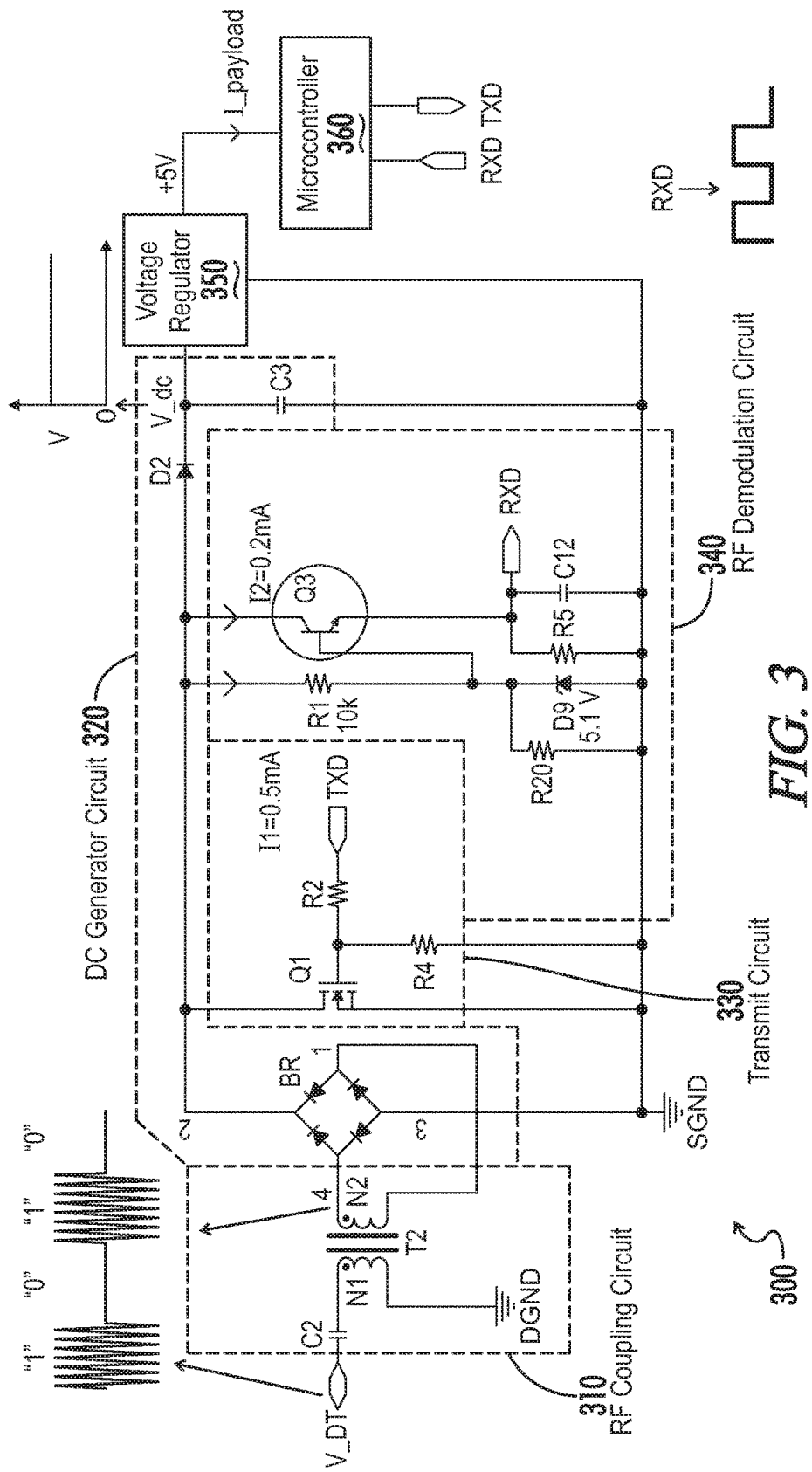
FIG. 3 illustrates a partial circuit schematic and block diagram of a single transistor peak detection circuit according to an exemplary embodiment.

FIG. 3 illustrates a partial circuit schematic and block diagram of a single transistor peak detection circuit 300 according to an exemplary embodiment. The single transistor peak detection circuit 300 includes an RF coupling circuit 310, a DC generator circuit 320, a transmit circuit 330, an RF demodulation circuit 340, a voltage regulator 350, and a microcontroller 360.

The RF coupling circuit 310 includes an input capacitor C2 and a digital ground DGND coupled to a first winding of a transformer T2. The RF coupling circuit 210 receives as input a development tool voltage V_DT. The development tool voltage V_DT is configured to include a DC component and an RF component. As shown in FIG. 3, the development tool voltage V_DT may include one or more pulses indicating a value of "1" when the development tool voltage V_DT is pulsed (e.g., nonzero) and a value of "0" when the development tool voltage V_DT is zero or is within an acceptable range of a threshold voltage value (e.g., as an offset). The RF component of the development tool voltage V_DT may correspond to the tuning signal modulated by the mixer 130 in one embodiment. A second winding of the transformer T2 is coupled to the DC generator circuit 220. The DC generator circuit 320 includes a bridge rectifier BR. The bridge rectifier BR is coupled to the secondary winding of the transformer T2. The DC generator circuit further includes a diode D2 and a capacitor C3. The diode D2 and the capacitor C3 are configured to rectify the modulated signal from development tool voltage V_DT and to hold the voltage to its peak level. In contrast to the system illustrated in FIG. 2, the DC generator circuit 320 does not include the payload current sensing resistor R21. By removing the payload current sensing resistor R21, the signal associated with V_dc can achieve maximum signal integrity.

The voltage regulator 350 is coupled to the DC generator circuit 320 and receives the voltage V_dc as input. The voltage regulator 350 is configured to provide a constant +5V output to the microcontroller 360. The payload current I_payload corresponding to the +5V output is received at the microcontroller 360. The microcontroller 360 has an input RXD and an output TXD associated with at least one of the transmit circuit 330 and the RF demodulation circuit 340.

The transmit circuit 330 includes at least one of a switch Q1 and resistors R2 and R4. The output TXD from the microcontroller 360 is coupled to the resistor R2. The resistor R2 is coupled at an opposite side to the gate of the switch Q1 and to the resistor R4. The transmit circuit 330 is configured to receive the output TXD from the microcontroller 360 and to clamp the modulated signal associated with the secondary winding of transformer T2 to zero for duration of a zero bit.

The RF demodulation circuit 340 includes a switch Q3 coupled to the DC generating circuit 320. The switch Q3 may be an NPN general purpose transistor in one embodiment. By implementing the switch Q3 as an NPN general purpose transistor, a matching counterpart switch Q4 is not required. As such, the switch Q3 can be a very cost-effective general purpose transistor thereby reducing cost. The RF demodulation circuit 340 further includes a resistor R1 coupled to the DC generating circuit 320 at a first side. The resistor R1 is coupled at an opposite side to the gate of switch Q3, to a resistor R28, and to a diode D9. In one embodiment, the diode D9 may be a 5.1V Zener diode. In this exemplary embodiment, the input RXD of microcontroller 360 is intrinsically protected by the Zener diode instead of an external 5V reference. Protection thus does not depend upon the signal quality status of the 5V reference in the embodiment illustrated by FIG. 3.

The switch Q3 may be directly biased by the resistor R1 in base pin such that only a tiny current is needed and the resistor R1 can be chosen with a fairly large resistance value. The internal current draw is minimized in this configuration. The collector of the switch Q3 is directly connected to a rectified input signal voltage source such that the dynamic response of the switch Q3 is maximized since the collector-emitter voltage difference of switch Q3 (Vce_Q3) is maintained at a maximum.

By implementing a circuit consistent with the exemplary embodiment illustrated by FIG. 3, a total internal current draw of the single transistor peak detection circuit 300 may be reduced compared to alternative designs. As illustrated by FIG. 3, during operation a first current I1 received at the resistor R1 from the DC generator circuit 320 may be equal to 0.5 mA and a second current I2 received at the collector of the switch Q3 from the DC generator circuit 320 may be equal to 0.2 mA. As such, the single transistor peak detection circuit 300 may have a total internal current draw of 0.7 mA.

Figure 4:
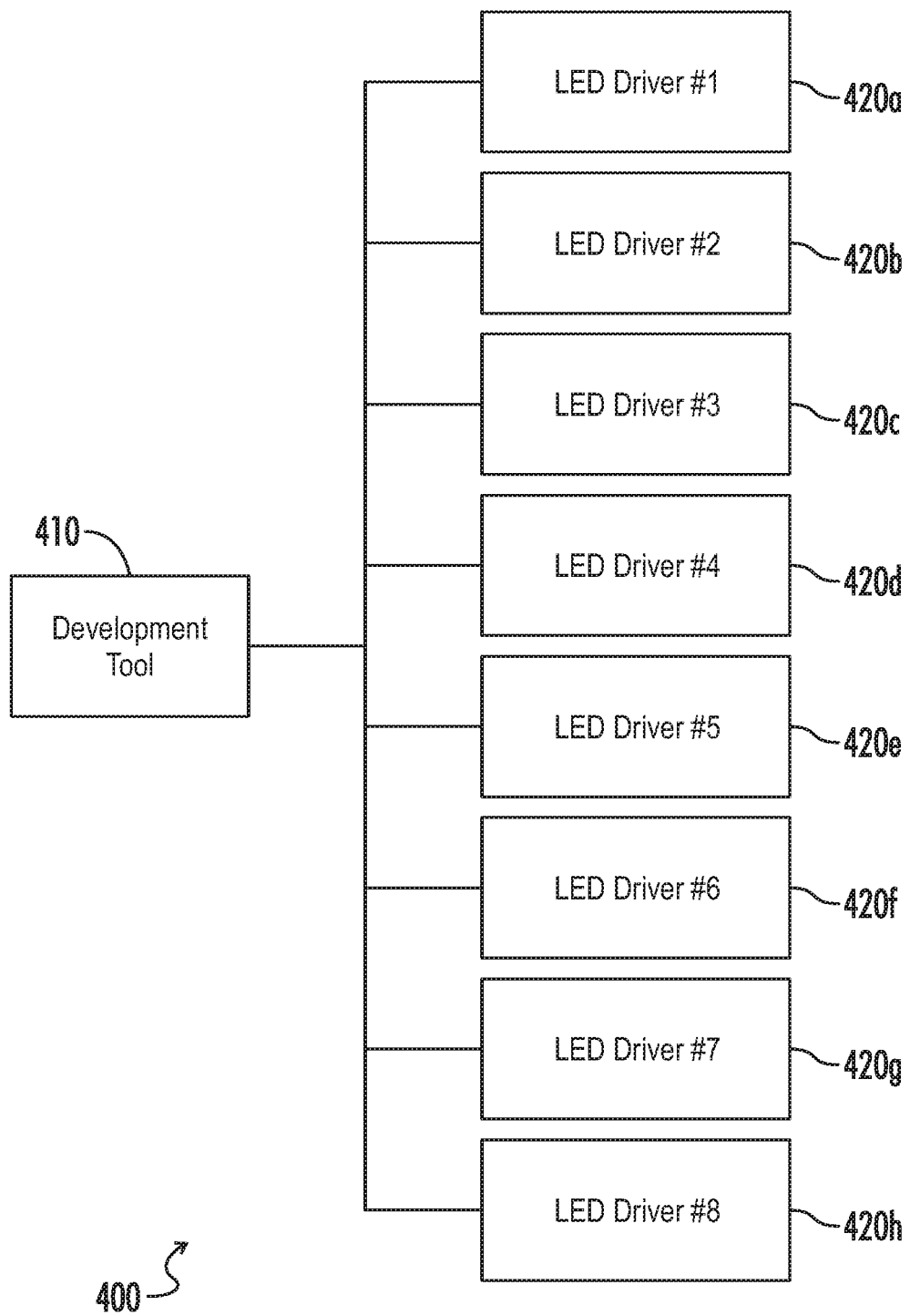
FIG. 4 illustrates a block diagram of batch tuning LED driver boards according to an exemplary embodiment.

The signals transmitted by a development tool via the RF coupling circuit 310 may permit driving a plurality (e.g., eight) LED driver boards simultaneously during unpowered tuning. FIG. 4 illustrates a block diagram 400 of batch tuning LED driver boards according to an exemplary embodiment. A development tool 410 may be used to tune one or more LED Drivers 420a-h. In one exemplary embodiment, the development tool 410 may be configured to simultaneously program two or more LED Drivers 420a-h. Additionally or alternatively, the development tool 410 may be configured to tune a single one of the LED Drivers 420a-h. In various embodiments, the development tool 410 may be equivalent to the development tool 110 as previously described herein.

The development tool 410 may be configured to couple with at least one of the LED Drivers 420a-h via wireless connection, wired connection, or any combination thereof. In one exemplary embodiment, the development tool 410 is configured to communicate with at least one of the LED Drivers 420a-h via RF signaling. The development tool 410 may be configured to provide at least a portion of a default, a predetermined, an individually-selected, a customized, or other tuning parameter or profile associated with at least one of the LED Drivers 420a-h. Communication between the development tool 410 and at least one of the LED Drivers 420a-h may be either unidirectional or bidirectional. For example, in one embodiment where communication is bidirectional, a development tool 410 may communicate a tuning parameter or profile to at least one of LED Drivers 420a-h and may receive at least one of instruction, feedback, and/or tuning status or confirmation from at least one of the LED Drivers 420a-h responsive to the communicated tuning parameter or profile.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims. The phrase "in one embodiment," as used herein does not necessarily refer to the same embodiment, although it may.

The term "circuit" means at least either a single component or a multiplicity of components, either active and/or passive, that are coupled together to provide a desired function. Terms such as "wire," "wiring," "line," "signal," "conductor," and "bus" may be used to refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. An LED driver circuit configured to be tuned via an unpowered tuning process, the LED driver circuit comprising:
   a radio frequency (RF) coupling circuit configured to receive an RF tuning signal having a plurality of bursts of RF energy, each burst including a plurality of cycles of an RF carrier, the RF coupling circuit configured to output a coupled RF tuning signal;
   a direct current (DC) generator circuit having a bridge rectifier configured to rectify the coupled RF tuning signal and to output a rectified RF tuning voltage;
   an RF demodulation circuit having an input and an output, the RF demodulation circuit configured to receive the rectified RF tuning voltage at the input and to selectively convert each burst of the rectified RF tuning voltage to a single DC pulse at the output, the RF demodulation circuit including a transistor having a collector connected to the input and having an emitter connected to the output, the transistor having a base connected to the input via an input resistor, the base further connected to a Zener diode configured to limit the base voltage and to thereby limit the emitted voltage on the output;
   a voltage regulator configured to receive the rectified RF tuning voltage and to output a regulated voltage; and
   a microcontroller configured to receive the output of the RF demodulation circuit, to receive the regulated voltage and to control one or more tuning operations of the LED driver circuit.

2. The LED driver circuit of claim 1, wherein the RF coupling circuit includes a transformer having a primary winding and a secondary winding, the transformer configured to receive the RF tuning signal at the primary winding and configured to output the coupled RF tuning signal via the secondary winding.

3. The LED driver circuit of claim 1, wherein the transistor is an NPN bipolar transistor.

4. The LED driver circuit of claim 1, wherein the RF coupling circuit is configured to couple to a RF tuning bus having at least one other LED driver circuit connected thereto.

5. The LED driver circuit of claim 1, wherein a total internal current draw of the LED driver circuit is less than 1 mA while being tuned in an unpowered tuning operation.

6. The LED driver circuit of claim 1, wherein the LED driver circuit is configured to receive both operating power and tuning data via the RF tuning signal during an unpowered tuning operation.

7. The LED driver circuit of claim 1, wherein the LED driver circuit is configured to receive the RF tuning signal from a development tool communicatively coupled to the LED driver circuit.

8. A method for performing unpowered tuning of an LED driver circuit having a microcontroller and a voltage regulator, the method comprising:
   receiving a radio frequency (RF) tuning signal having a plurality of bursts of RF energy, each burst including a plurality of cycles of an RF carrier;
   generating a coupled RF tuning signal based at least in part upon the RF tuning signal;
   rectifying the coupled RF tuning signal and outputting a rectified RF tuning voltage;
   selectively converting each burst of the rectified RF tuning voltage to a single DC pulse at least in part via a single transistor;
   limiting a base voltage of the single transistor to thereby limit a microcontroller input voltage;
   receiving the rectified RF tuning voltage at a voltage regulator and outputting a regulated voltage from the voltage regulator;
   receiving the microcontroller input voltage and the regulated voltage at the microcontroller; and
   controlling one or more tuning operations of the LED driver circuit by the microcontroller.

9. The method of claim 8, further comprising:
   receiving the RF tuning signal at a primary winding of a transformer of the LED driver circuit; and
   outputting a coupled RF tuning signal via a secondary winding of the transformer.

10. The method of claim 8, further comprising:
    coupling the LED driver circuit to an RF tuning bus having at least one other LED driver circuit coupled thereto; and
    tuning both of the LED driver circuit and the at least one other LED driver circuit via the RF tuning bus.

11. The method of claim 8, further comprising operating a total internal current draw of the LED driver circuit at less than 1 mA while the LED driver circuit is tuned in an unpowered tuning operation.

12. The method of claim 8, further comprising:
    receiving both operating power and tuning data via the received RF tuning signal during an unpowered tuning operation.

13. The method of claim 8, wherein the receiving an RF tuning signal further comprises receiving the RF tuning signal from a development tool communicatively coupled to the LED driver circuit.

14. A system for providing unpowered tuning of light emitting diode (LED) drivers, the system comprising:
    a development tool including,
       a development microcontroller;
       a mixer coupled to the development microcontroller; and
       a carrier signal generator coupled to the mixer,
       wherein the development microcontroller is configured to communicate a radio frequency (RF) signal to the mixer, and the mixer is configured to generate a RF tuning signal at least in part according to a carrier signal generated by the carrier signal generator; and
    at least one LED driver circuit, each LED driver circuit including,
       a radio frequency (RF) coupling circuit configured to receive the RF tuning signal including a plurality of bursts of RF energy from the development tool, each burst including a plurality of cycles of an RF carrier, the RF coupling circuit configured to output a coupled RF tuning signal;
       a direct current (DC) generator circuit having a bridge rectifier configured to rectify the coupled RF tuning signal and to output a rectified RF tuning voltage;
       an RF demodulation circuit having an input and an output, the RF demodulation circuit configured to receive the rectified RF tuning signal at the input and to selectively convert each burst of the rectified RF tuning voltage to a single DC pulse at the output, the RF demodulation circuit including a transistor having a collector connected to the input and having an emitter connected to the output, the transistor having a base connected to the input via an input resistor, the base further connected to a Zener diode configured to limit the base voltage and to thereby limit the emitted voltage on the output;

a voltage regulator configured to receive the rectified RF tuning voltage and to output a regulated voltage; and a driver microcontroller configured to receive the output of the RF demodulation circuit, to receive the regulated voltage and to control one or more tuning operations of the LED driver circuit.

15. The system of claim 14, wherein the RF coupling circuit includes a transformer having a primary winding and a secondary winding, the transformer configured to receive the RF tuning signal at the primary winding and configured to output the coupled RF tuning signal via the secondary winding.

16. The system of claim 14, wherein the transistor is an NPN bipolar transistor.

17. The system of claim 14, wherein the RF coupling circuit is configured to couple to a RF tuning bus having the development tool and at least one other LED driver circuit connected thereto.

18. The system of claim 14, wherein a total internal current draw of each LED driver circuit is less than 1 mA while being tuned in an unpowered tuning operation.

19. The system of claim 14, wherein each LED driver circuit is configured to receive both operating power and tuning data via the received RF tuning signal during an unpowered tuning operation.

20. The system of claim 14, wherein the development tool comprises a memory, the development tool being configured to store one or more tuning parameters in the memory and to transmit at least one of the one or more tuning parameters to the LED driver circuit as at least a part of the RF tuning signal.

* * * * *